Dec. 2, 1969  L. C. STEARMAN  3,481,567
DETACHABLE FUSELAGE AIRCRAFT
Filed May 8, 1967  2 Sheets-Sheet 1
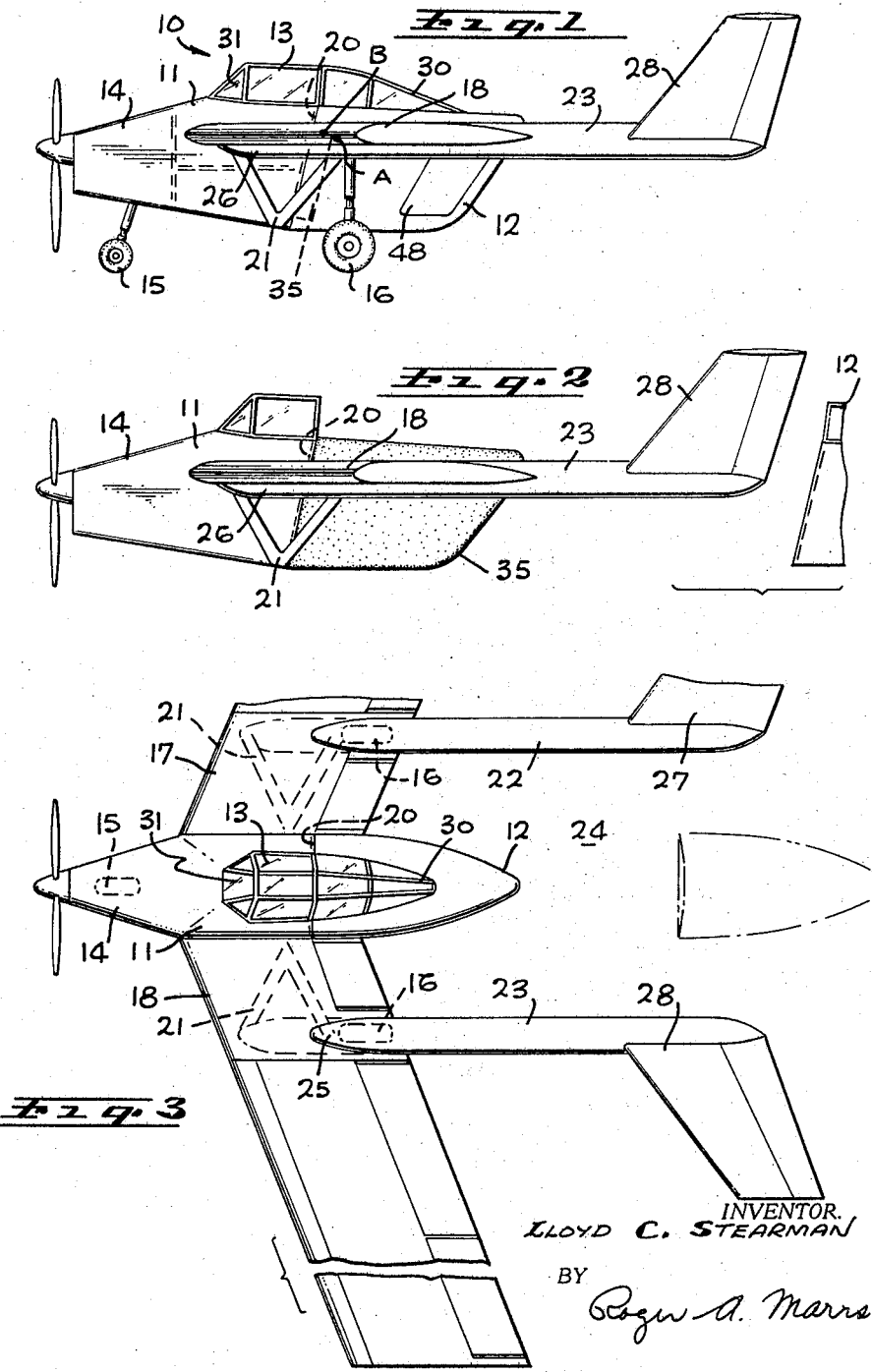
INVENTOR.
LLOYD C. STEARMAN
BY
Roger A. Marrs Dec. 2, 1969  L. C. STEARMAN  3,481,567
DETACHABLE FUSELAGE AIRCRAFT
Filed May 8, 1967  2 Sheets-Sheet 2
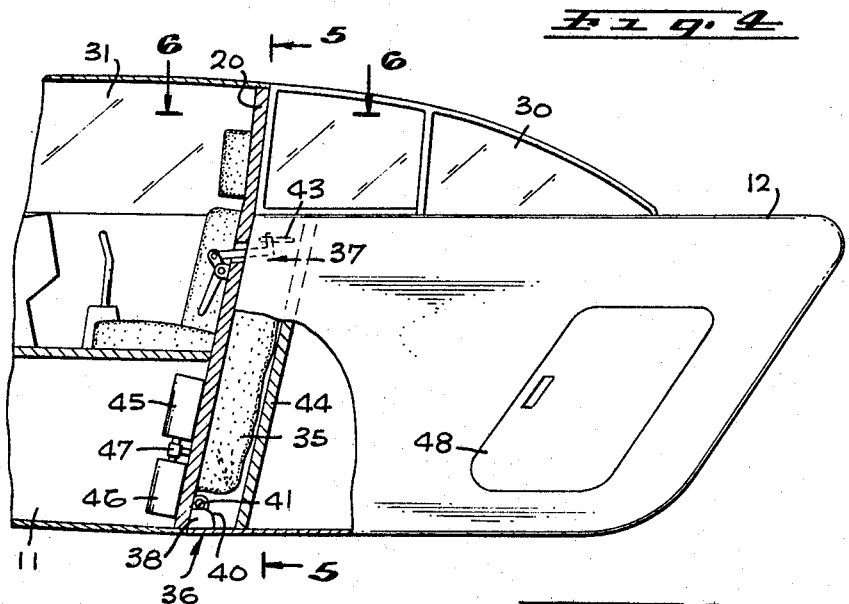
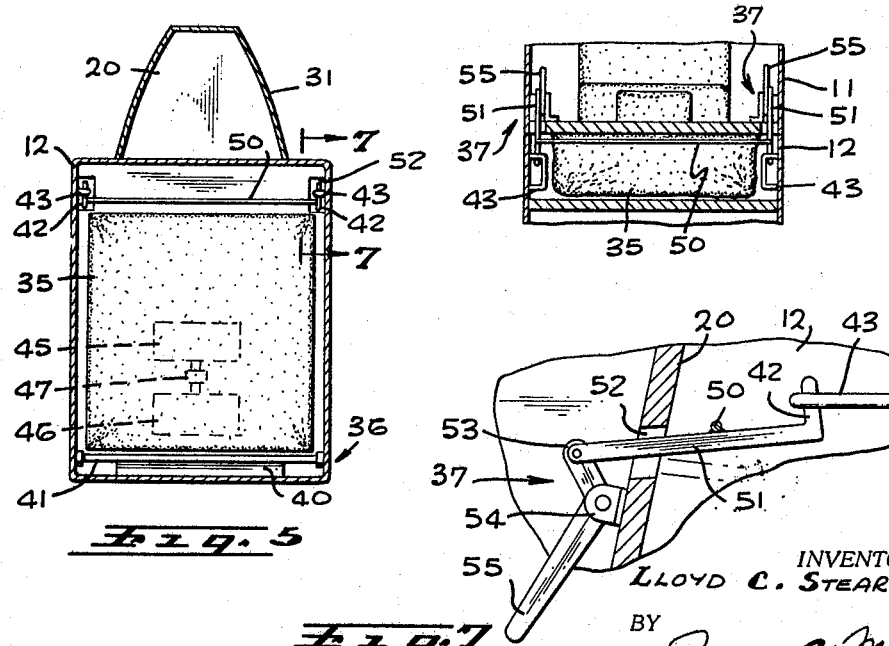
INVENTOR.
LLOYD C. STEARMAN
BY Roger A. Marrs

United States Patent Office 3,481,567
Patented Dec. 2, 1969

3,481,567
DETACHABLE FUSELAGE AIRCRAFT
Lloyd C. Stearman, 18545 Sunburst St.,
Northridge, Calif. 91324
Filed May 8, 1967, Ser. No. 636,906
Int. Cl. B64d 47/00, 9/00
U.S. Cl. 244—118                                    12 Claims

ABSTRACT OF THE DISCLOSURE

An aircraft is described including a central main fuselage on which a swept-back, mid-wing is supported. A pair of parallel laterally spaced fuselage sections or booms are cantilevered rearwardly from each wing section on opposite sides of the central fuselage with separate and individual empennage sections outwardly projecting at an oblique angle at the extreme terminating end of each lateral fuselage section so as to define an open area between the fuselage section allowing unrestricted access to the aft portion of the central fuselage. The central fuselage includes a fore section for mounting the aircraft power plant, a mid-section serving as a pilot's compartment and an aft portion comprising a detachable personnel or cargo carrier. A release mechanism is provided for connecting and disconnecting the cargo carrier to and from the mid-section and an auxiliary expandable member is carried on the mid-section operable to replace the detached cargo carrier which has a general aerodynamic configuration when expanded corresponding to the overall shape of the cargo carrier.

BACKGROUND OF THE INVENTION

Field of the invention

The present invention relates in general to aircraft having detachable or removable fuselage portions and, more particularly, to that type of aircraft in which a portion of the fuselage is detachable or separable from the main fixed fuselage which remains with the airplane and in which the main fuselage is employed to house the pilot compartment, controls and other equipment necessary for the flight of the aircraft with or without the removable portion.

Description of the prior art

Fixed fuselage aircraft of the transport type heretofore utilized for the transportation of cargo have had a considerable lack of versatility resulting in a relatively great loss of time in effecting the transfer of cargo onto and off aircraft where bulk cargo is involved. Also, special handling devices and equipment are necessary wherever any reduction in time over hand-loading is to be accomplished. In light of modern technology, the fact that fuselages of fixed form and configuration have been maintained has made the rapid loading and unloading of cargo an extremely difficult task.

Although some designs for aircraft have been advanced which have had for their aim an aircraft adapted to the employment of preloaded cargo containers, even here, the design of such aircraft has followed conventional designs to such an extent that complete ease in loading and unloading has never been accomplished. In such aircraft, the separable fuselage portion, which is generally referred to as the "carrier" or the "pod" is essentially a cargo, equipment or freight container suitably shaped to complement the shape of the main fuselage which is a fixed and integral part of the aircraft. Advantages of such detachable fuselage aircraft have been recognized for some time in that a cargo can be flown in the carrier attached to the aircraft, to a given location as a unit, where it is quickly detached from the airplane without the necessity of the expenditure of the time and labor required to unload a conventional fuselage. At the same time, it is possible for the aircraft, as soon as the detachable portion has been quickly released, to be flown away with its crew for other use without the necessity of remaining idle on the ground subjecting it to increased cost of operation as well as to the possibility of damage or capture during military operations.

Furthermore, since the center of gravity of a loaded airplane must be held to close limits relative to the aerodynamic center of lift, the normal practice when aircraft of the fixed fuselage configuration is involved, is to carefully distribute and apportion the load. Such a practice may be found difficult to accomplish if a variety of containers were to be randomly loaded at remote points by unskilled persons and then delivered to the airport for attachment to the airplane, so that it is not contemplated in such fixed fuselage aircraft configurations to provide adjustment means for balancing the loaded cargo compartment relative to the airplane. In airplanes employing detachable fuselage portions, the problem of maintaining close limits on the aircrafts' center of gravity is particularly acute since the cargo carrier generally fits within an enlarged hole or gap formed in the fuselage which is defined by substantial reinforcing means formed in the main fuselage in order to accommodate various aerodynamic loads encountered during flight. Because of these considerations, most conventional aircraft employing detachable cargo carriers are unable to sustain normal flight so as to be airworthy when the cargo carrier has been detached. Thus, such aircraft are greatly restricted during flight and such an aircraft is incapable of high performance.

Typical examples of conventional and prior art aircraft employing cargo carriers or pods are represented by U.S. Letters Patents issued having numbers 2,577,287; 2,650,049; 2,463,346; 2,476,538; and 2,480,279. However, all of the aircraft disclosed in these patents suffer from one or more of the problems mentioned above.

SUMMARY OF THE INVENTION

Accordingly, the problems and difficulties encountered with conventional aircraft employing detachable cargo carriers as a part of the main fuselage are obviated by the present invention which provides an aircraft having a main fuselage incorporating a jettisonable cargo carrier which constitutes the aft section of the main fuselage and incorporating rearwardly extending laterally spaced fuselage sections which are cantilevered from opposite wing sections of a swept-backed, mid-wing supported from the main fuselage immediately ahead of the aft section thereof. The lateral fuselage sections are truly cantilevered in that the extended free ends of each section support are separated and non-connectable tail sections so that a predetermined open area is defined therebetween providing unrestricted access to the fuselage aft section to accommodate the attaching or detaching of the cargo carrier either on the ground or in flight. Means are provided for releasably connecting the cargo carrier to the main fuselage section so that the carrier may be selectively connected or disconnected therewith.

The cargo carrier is streamlined in shape and intended to form an aerodynamic part of the main fuselage configuration so that the center of gravity of the aircraft is substantially the same whether the carrier is connected or disconnected.

A feature of the present invention resides in the provision of an expandable member carried at the interface of the aft section with the main fuselage section having means operably connected thereto for causing the expansion of said member so as to occupy the vacant area of the aft section when the cargo carrier has been detached, such as, for example, while the aircraft is in flight. The extendable member has an exterior configuration substantially similar to the cargo carrier so that the aerodynamics of the aircraft are not noticeably altered during flight should the cargo carrier be detached and the expandable member deployed in its place.

Therefore, it is a primary object of the present invention to provide a unique and novel cargo type aircraft wherein the cargo carrier is detachable to facilitate interchange and preloading of various cargoes and in which the aircraft itself is airworthy and groundworthy with or without a cargo carrier attached thereto.

Another object of the present invention is to provide a cooperating and separable aircraft and cargo carrier wherein the aircraft forms a unit which is entirely self-contained and capable of operation alone while taxiing on the ground and preferably, capable of operation alone in flight and so arranged that the various electric, hydraulic, and cable operating connections are entirely self-contained in the aircraft itself, and therefore protected from the damage that inevitably accompanies cargo handling, especially in the light-weight structure so necessary for aircraft components.

Another object of the present invention is to provide a novel aircraft having a detachable cargo carrier wherein the airplane is self-contained and aerodynamically balanced with or without the cargo carrier and wherein the cargo carrier may be selectively released in an emergency to enable the aircraft and its crew to avoid an imminent crash, since the release of so much weight would permit rapid maneuvering which might be otherwise impossible with a fully loaded aircraft.

Still another object of the present invention is to provide a novel aircraft having a jettisonable cargo carrier which forms an aerodynamic part of the aircraft fuselage and which includes an expandable member adapted to be deployed in the vacant space previously occupied by the cargo carrier when the carrier has been jettisoned so that the aerodynamic center of gravity of the aircraft is substantially maintained unchanged during flight.

Still a further object of the present invention is to provide a novel high performance aircraft having improved performance characteristics incorporating a detachable cargo carrier constituting the aft section of the main fuselage and further incorporating laterally spaced fuselage sections which extend rearwardly in cantilevered supporting securement to the aircraft's wings so as to define an open area therebetween permitting restricted access to the detachable cargo carrier.

Yet a further object of the present invention is to provide a novel aircraft incorporating a quick change and jettisonable payload cargo carrier which is completely separate from the aircraft structure and which may be employed as a high performance aircraft for a variety of operations and missions whether the payload carrier is connected or disconnected.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a side elevational view of a separable fuselage aircraft of the present invention incorporating a detachable cargo carrier;

FIGURE 2 is a side elevational view of the aircraft similar to the view in FIGURE 1 showing an auxiliary expandable fuselage aft section adapted to replace the detached cargo carrier as indicated in broken lines;

FIGURE 3 is a top plan view of the aircraft shown in FIGURE 1 illustrating unrestricted accessibility to the aft section of the main fuselage for connection or disconnection of the cargo carrier;

FIGURE 4 is an enlarged side elevational view, partly in section, of the main fuselage and the detachable cargo carrier;

FIGURE 5 is a cross-sectional view of the aircraft shown in FIGURE 4 as taken in the direction of arrows 5—5 thereof;

FIGURE 6 is a sectional view of the aircraft showing the mechanism for releasably attaching the cargo carrier to the main fuselage as taken in the direction of arrows 6—6 of FIGURE 4; and FIGURE 7 is an enlarged sectional view of the release mechanism as taken in the direction of arrows 7—7 of FIGURE 5.

DESCRIPTION OF THE PREFERRED EMBODIMENT

In the present embodiment chosen for the purpose of illustrating the present invention herein disclosed, there is shown an aircraft particularly adapted to transport of cargo, passengers and supplies, readily susceptible for employment in performing operations and missions in connection with agricultural activities such as pest control, seeding, fertilizing, or military purposes such as low level missions including strafing, logistics, reconnaisance as well as cargo transportation and observation. In the form presented for disclosure, the aircraft consists of a central main fuselage indicated in the direction of arrow 10 comprising a fixed main fuselage 11 and an aft portion 12 constituting a detachable cargo or personnel carrier. The fixed main fuselage portion 11 is provided with a conventional cockpit or pilot compartment portion 13 disposed immediately behind an engine compartment 14 for housing a turboprop engine constituting the power plant for driving or propelling the aircraft. Retractable tricycle landing gear is provided for supporting the aircraft on the ground which is represented by a nose gear assembly 15 and a pair of main gear assemblies 16. As illustrated, the landing gear is shown in its extended position and it is to be understood that during flight, the landing gear is retracted so that the nose gear is stored within the central fuselage while the main gear's assemblies are housed within compartments formed in the wing.

Referring now in detail to FIGURES 1 and 2, it can be seen that the aircarft includes a swept-back, mid-wing having wing sections 17 and 18 joined to opposite sides of the fixed main fuselage 11 immediately adjacent to the pilot's compartment 13. The root of each wing section is located immediately ahead of a rear bulkhead 20 against which the cargo carrier 12 joins with the fixed main fuselage 11. Each wing section is suitably braced to the main fixed fuselage 11 by means of struts 21.

The aircraft further includes twin lateral fuselage sections or booms 22 and 23 which are similar in all respects and balanced equidistant on opposite sides of the central fuselage but at a distance substantially removed therefrom. The lateral fuselage sections are cantilevered rearwardly from the wing sections 17 and 18 in fixed spaced apart relationship so as to define a central open area therebetween indicated by numeral 24 into which area the rearmost portion of the cargo carrier 12 projects when connected to the fixed main fuselage 11. The cantilevered lateral fuselage sections are supported from each wing by conventional aircraft construction but which includes an upper fairing 25 which terminates on top of each wing section midway between the leading and trailing edges thereof and a lower fairing 26 which terminates adjacent to the leading edge of each wing section. It is to be particularly noted that the terminating end of each extended lateral fuselage section carries a separate and individual empennage represented by numerals 27 and 28 associated with boom or fuselage sections 22 and 23, respectively. Each empennage extends outwardly and upwardly at an obtuse angle so as to maintain the entrance into area 24 unrestricted for ready access to the cargo carrier 12. It is to be particularly noted that the empennages 27 and 28 constitute conventional combined horizontal and vertical stabilizers and that there is a total lack of an interconnecting tail structure therebetween which is customary in conventional twin boom aircraft.

The shape and configuration of the cargo carrier 12 is intended to complete or to serve as a complement for the overall aerodynamic streamlined shape of the central fuselage 10, that is, to provide a complete airplane having minimum drag or resistance characteristics in flight. The cargo carrier is preferably of the same width as the fixed main fuselage 11 and may be provided with an upper rear rounded canopy portion 30 to complementarily engage the corresponding canopy or windshield arrangement 31 at the intersection of the transverse rear bulkhead 20 on the fixed main fuselage. Construction in this fashion permits the cargo carrier 12 to be a coextension of the main fuselage as well as an integral part thereof whether the aircraft is in flight or on the ground. When on the ground, the aircraft will preferably land and take-off upon the tricycle landing gear and additional wheels or other support are not required to be carried by the cargo carrier as is sometimes required with conventional pod carrying aircraft.

Referring now to FIGURE 2 in detail, the cargo carrier 12 is illustrated as being detached while the aircraft is in flight wherein the carrier is replaced by an expandable structure indicated by numeral 35. In one form, the expandable structure 35 is represented by an inflatable member which is readily deployable to extend rearwardly from the transverse bulkhead 20 when the carrier 12 has been selectively detached from the fixed main fuselage 11. Inasmuch as the area 24 between the lateral fuselage sections 22 and 23 is unrestricted, the carrier may be readily jettisoned without fear of interference with the aircraft empennage.

The expandable member 35 may take the form of a pneumatic bag composed of synthetic rubber, plastic-like material or other composition which may be readily compacted for storage in a minimum volume of space and yet may be rapidly expanded under the force of pneumatic pressure. The expandable member 35 is illustrated in FIGURE 1 in its stored configuration against the rear side of the transverse bulkhead 20. The expandable member is fixedly secured on one end to the bulkhead by any suitable means, such as fasteners, high pressure adhesive or the like, so that when subjected to pneumatic pressure, the main portion or bulk of the member is forcibly urged rearwardly to occupy the same general area as the detached cargo carrier area so as to complement the fixed main fuselage. When extended, the expandable member 35 constitutes the aft portion of the aircraft central fuselage. A feature of the present invention provides that the overall configuration of the expandable member 35 substantially corresponds to the general shape and configuration of the cargo carrier so that the expandable member represents an aerodynamic shape having characteristics of minimum drag and weight. As illustrated, the expandable member 35 does not include a complementary windshield or canopy arrangement similar to the forward canopy 31. However, it is understood that, if desired, such a complementary rear canopy can be provided as part of the expandable member 35. In such an instance, it may not be necessary to duplicate the rear windshield or canopy 30 but merely to provide a simulated configuration of the same so as to maintain favorable aerodynamic fuselage characteristics.

The aerodynamic construction of the aircraft is such that a center of gravity is provided at point A when the cargo carrier 12 is attached and fully loaded to its rated capacity. However, when the aircraft is in flight and the carrier 12 has been detached, the center of gravity is changed only slightly to a point represented by letter B since the carrier provides drag. Therefore, the cargo carrier is detachable from the fixed main fuselage 11 without the necessity of providing additional means for adjustably positioning weights or counterbalances in order to compensate for the lightening of load when the carrier has been jettisoned. The pilot's or control compartment 13 is built into the fixed main fuselage, that is, separated from the cargo carrier with all necessary operating and functioning controls being carried forward to the engine compartment 14 and through the wing and boom sections to the wing and empennage control surfaces. Thus, the airplane becomes in effect a separate and self-contained unit, flyable and movable with or without the cargo carrier.

Referring now in detail to FIGURES 4-6 inclusive, it is seen that the cargo carrier 12 is detachably connected to the rear wall of the transverse bulkhead 20 via a lower detachable mount indicated in the direction of arrow 36 and an upper combined release and detachable mount indicated in the direction of arrow 37. The lower mount includes a stationary bracket 38 having a downwardly sloping ramp surface 40. A transverse rod 41 is secured to the carrier across the width thereof and is adapted to supportingly rest on the mount 38 when it is desired to attach the carrier to the bulkhead 20. However, when the carrier has been released or jettisoned, the weight of the carrier will cause the carrier to pivot about the central longitudinal axis of the rod 41 and the increase drag of the carrier will cause the rod 41 to slide or rotate down the ramp 40 out of engagement therewith. With respect to the upper releasable mount 37, it is noted that a release mechanism includes a hook member 42 which is detachably connected with an eyelet 43 through the central opening thereof. The latch firmly secures the carrier to the bulkhead 20 and since the front face of the carrier is nested against the rear face of the fuselage, the carrier will not be forced to separate from the fuselage while the latch is connected. The remainder of the release mechanism will be described later with respect to FIGURE 7.

It is to be particularly noted that the transverse bulkhead 20 is inclined at an angle so that the pivoting axis about rod 41 lies substantially forward of the engagement between hook 42 and eyelet 43. Such an arrangement ensures that the carrier 12 will be properly jettisoned to be free and clear of the fixed main fuselage 11 when the release mechanism has ben actuated.

The expandable member 35 is fixed to the rear surface of the bulkhead 20 and is disposed in a storage compartment between the bulkhead 20 and a bulkhead 44 defining the forward end of the cargo compartment or storage area within carrier 12. Such a provision prevents cargo, equipment or other baggage from puncturing, marring or otherwise damaging the material of the expandable structure 35 during loading or during flight. Fixedly disposed on the forward surface of the bulkhead 20 are a pair of air cylinders 45 and 46, each containing a pressurized supply of air for pneumatically supplying the expandable member 35 with a medium adapted to fully expand the member 35 into a substantially rigid aft portion for the fixed main fuselage. The air cylinders are under the selective control of the pilot and are suitably connected to the structure 35 via a T-joint and conduit indicated by numeral 47.

The cargo carrier 12 may be provided with an access door 48 whereby access to the storage compartment rearward of bulkhead 44 may be had without detaching the carrier from the main fuselage. The door may be operated on hinges or may be remotely actuated for removal from within the pilot's compartment as desired.

Referring now in particular to FIGURES 5 and 6, it can be seen that the hook and eyelet arrangement 42 and 43 are disposed on opposite sides of the fuselage and carrier and that although the eyelets are separately disposed on the inside wall surface of the carrier 12, the hook portions 42 are connected together by means of a transverse bar or rod 50 which is suitably welded or otherwise secured to the hook portions so that the hook portions may be readily moved together by a single selective actuation by the pilot.

Referring now in detail to FIGURE 7, the upper release and attachment mount 37 is indicated wherein the hook 42 is shown in its position with respect to eyelet 43 in solid lines when the carrier is connected to the main fuselage, and indicated in broken lines when the carrier is detached therefrom. The hook 42 includes an elongated shank 51 which passes through an aperture 52 formed in bulkhead 20 where its opposite end is pivotally attached to a lever arm 53 midway between its opposite ends. The opposite ends of lever 53 include a pivotal attachment to a bracket 54 carried on bulkhead 20 and having its opposite end formed into a downwardly depending handle 55 which may be readily grasped by the hand of the pilot when it is desired to release the carrier. Pivoting of shank 51 with respect to handle 55 cannot be achieved unless handle 55 is actuated. During release, the handle 55 is pulled upward so that lever 53 pivots on its connection with bracket 54 causing the shank 51 and its attendant hook 42 to move rearwardly and downwardly so that the hook clears the eyelet 43. At such time, the weight of the carrier 12, through gravitational forces, will cause the upper part of the carrier to separate from the bulkhead 20 and pivot about the transverse axis of rod 41 which, in turn, causes the rod 41 to slide down the ramp 40 to complete the separation of the carrier from the fixed fuselage.

Although only a single handle 55 is required for actuation of the release mechanism due to the inclusion of the coupling bar 50, a pair of handles 55 is shown with a duplicate release mechanism so that the release of the carrier 12 may be readily effected by either a right-handed or a left-handed pilot or by the use of both hands in the event such action is required. However, it is to be readily understood that the release mechanism may take the form of electro-mechanical means incorporating solenoids or other components so that release of carrier 12 need not be necessarily a totally manual operation.

In the normal operation of the aircraft and separable cargo carrier of this invention, the cargo carrier will be preloaded either at a loading dock at the airport, or at the shipper's plant, and then transported to the aircraft by any suitable means, such as, for example, a conventional forklift vehicle. When ready to connect to the aircraft, either the carrier or the aircraft is maneuvered or taxied into engagement position whereby the carrier progresses between the fuselage sections 22 and 23 so that its bulkhead 44 is adjacent the bulkhead 20. The carrier should be slightly higher than the outwardly projecting lower mount 38 so that the transverse rod 41 carried by the carrier may be lowered on top of the mount so as to be supportably seated thereon. Next, the handle 55 may be actuated so as to pivot the hooks 42 upwardly into engagement through the central opening of the eyelets 43.

Therefore, it can be seen that the unique aircraft of the present invention provides a high performance airplane having overall design characteristics for making it possible to employ a jettisonable cargo carrier which need not be particularly loaded so as to compensate for any change in aerodynamic center of lift. The cargo carrier 12 may be employed to house a tank, such as one having a capacity of 400 gallons which may be employed for agricultural purposes, in dispensing fish for fish planting purposes, or fire extinguishing chemicals utilized in fire fighting applications. In such instances, it is contemplated that the tank may be jettisonable per se or valve actuated to permit the contents of the tank to be dispensed. Likewise, it is also contemplated that the cargo carrier may be employed in some operations to carry passengers and it is contemplated that two passengers may be enclosed within the carrier as shown. In such applications, the carrier may include other equipment for performing photographic and mapping missions as well as observation assignments.

In one form of the invention, it is contemplated that the wing area be 315 square feet and that the aircraft equals an empty weight of 2,415 pounds. A typical useful load, including pilot, 80 gallons of kerosene fuel, oil and a payload of 3,000 pounds would represent an overall load weight of 3,735 pounds. The gross weight of the aircraft would be approximately 6,150 pounds. It is further contemplated that the wing span be 42 feet and that a distance of 12 feet be established between the main landing gears which is substantially the same distance between the cantilevered fuselage sections 22 and 23. Preferably, the empennage is 9.6 feet in height from the ground and the empennage projected at approximately a 35° angle from the horizontal axis of the wing. Overall length from nose spinner to empennage is 31 feet and for increasing the performance of the aircraft, it is contemplated that automatic leading edge slots may be provided on the wing.

Power for the aircraft takes the form of a turboprop engine having approximately 580 horsepower with a power loading of 10.6 pounds per horsepower. Wing loading is designed for 19.52 pounds per square foot and maximum speed at sea level is estimated at 200 miles per hour.

What is claimed is:
1. An aircraft which comprises:
   a central fuselage including a fixed main fuselage and a cargo carrier detachably secured thereto;
   a swept-back mid-wing supported on said central fuselage forward of said cargo carrier and adapted to support the aircraft in flight;
   twin lateral boom sections cantilevered on said wing on opposite sides of said central fuselage and projecting rearwardly in fixed spaced apart relationship to define an open area therebetween, each lateral fuselage section having separate empennage sections carried on the free end thereof;
   said fixed main fuselage constituting the forward portion of said central fuselage including pilot's compartment and power plant and said detachable cargo carrier constituting the aft portion of said central fuselage in which said cargo carrier is selectively movable substantially along the center line of the aircraft when detached and through said open area with sufficient clearance between said lateral boom sections to avoid any contact with the aircraft;
   a releasable mechanism cooperatively carried on said fixed main fuselage and said cargo carrier to readily effect connection or disconnection of said cargo carrier with or from the rear of said fixed main fuselage;
   wherein said cargo carrier is formed with an aerodynamic configuration complementary to said fixed main fuselage when connected thereto; and
   an inflatable member carried on said fixed main fuselage and adapted to be deployed rearwardly therefrom to replace said cargo carrier when disconnected and having an aerodynamic configuration substantially similar to the configuration of said cargo carrier.
2. The invention as defined in claim 1 including
   pneumatic means carried on said fixed main fuselage for inflating said expandable member so as to forcibly urge and extend said expandable member into a portion of said open area whereby said expandable member constitutes the aft portion of said central fuselage.
3. The invention as defined in claim 2 wherein
   each of said separate empennage sections project outwardly in opposite directions and upwardly at an oblique angle with respect to the horizontal center line of the aircraft so as to provide an unrestricted entrance of said open area.
4. The invention as defined in claim 3 wherein the aircraft comprises a self-contained and flyable vehicle with or without said cargo carrier.

5. The invention as defined in claim 4 wherein
the center of gravity of the aircraft is substantially constant and unchanged when said cargo carrier is detached from said fixed main fuselage.

6. The invention as defined in claim 5 wherein
said power plant is a single turboprop engine and including retractable tricycle landing gear.

7. The invention as defined in claim 1 wherein
said fixed main fuselage terminates in an angled bulkhead having a mount secured to the bottom thereof for supporting said cargo carrier;
a rigid member carried on said cargo carrier adapted to be seated on said mount; and
said cargo carrier adapted to pivot about the central axis of said member when said cargo carrier is released whereby said cargo carrier will separate from said fixed main fuselage under the influence of gravitational force.

8. An aircraft comprising:
a central fuselage including a fixed main fuselage portion and an enclosed carrier portion detachably secured thereto;
said carrier portion having a bottom, sides, ends and a top cooperating to define an enclosed cargo compartment;
a swept-back, mid-wing supported on said central fuselage forward of said carrier portion and adapted to support the aircraft in flight; and
a pair of lateral boom sections cantilevered on said wing on opposite sides of said central fuselage and projecting rearwardly in fixed spaced apart relationship to define an open, unrestricted area therebetween adapted to accommodate passage of said carrier portion when detached from said main fuselage portion, said lateral booms being connected together solely by said mid-wing and each lateral boom having separate empennage sections carried on the free end thereof extending outwardly from said booms respectively;
said carrier portion being a unitary structure adapted to be detached as a unit wherein the aircraft is a self-contained and flyable vehicle with or without said carrier portion.

9. The invention as defined in claim 8 including
an inflatable member carried on said fixed main fuselage portion having a stored position adjacent said carrier portion and an expanded position rearward of said stored position for replacing said carrier portion, said member in its expanded position substantially corresponding to the contour and shape of said carrier portion.

10. An aircraft comprising:
a central fuselage including a fixed main fuselage portion and a jettisonable carrier portion detachably secured thereto;
a swept-back, mid-wing supported on said central fuselage forward of said carrier portion and adapted to support the aircraft in flight;
a pair of lateral boom sections cantilevered on said wing on opposite sides of said central fuselage and projecting rearwardly in fixed spaced apart relationship to define an open, unrestricted area therebetween adapted to accommodate passage of said carrier portion when jettisoned in flight, said lateral booms being connected together solely by said mid-wing and each lateral boom having separate empennage sections carried on the free end thereof extending outwardly from said booms respectively;
said jettisonable carrier portion being a unitary structure adapted to be detached as a unit; and
an inflatable member carried on said fixed main fuselage portion having a stored position adjacent said carrier portion and an expanded position rearward of said stored position for replacing said carrier portion, said member in its expanded position substantially corresponding to the contour and shape of said carrier portion.

11. The invention as defined in claim 8 wherein
said fixed main fuselage portion terminates in a mount secured to the bottom thereof for supporting said cargo carrier portion;
a rigid member carried on said cargo carsier adapted to be seated on said mount; and
said carrier portion adapted to pivot about the central axis of said member when said carrier portion is released whereby said carrier portion will separate from said fixed main fuselage under the influence of gravitational force.

12. The invention as defined in claim 8 including
releasable securement means coupling said carrier portion sides to said fixed main fuselage portion.

References Cited

UNITED STATES PATENTS

| | | | |
|---|---|---|---|
| 2,514,045 | 7/1950 | Gardenhire | 244—118 |
| 2,577,287 | 12/1951 | Sullivan | 244—118 |
| 2,759,691 | 8/1956 | Weaver | 244—118 |
| 2,941,762 | 6/1960 | Blair | 244—135 |
| 2,697,569 | 12/1954 | Westcott | 244—137 X |

OTHER REFERENCES

Janes, All the World's Aircraft, 1965–1966, p. 249 (Jovair J–2).

Janes, All the World's Aircraft, 1965–1966, p. 277 (North American OV–10A).

MILTON BUCHLER, Primary Examiner

THOMAS W. BUCKMAN, Assistant Examiner

U.S. Cl. X.R.

244—119, 137